US010026399B2

(12) United States Patent
Gopalan et al.

(10) Patent No.: US 10,026,399 B2
(45) Date of Patent: Jul. 17, 2018

(54) ARBITRATION BETWEEN VOICE-ENABLED DEVICES

(71) Applicant: Amazon Technologies, Inc., Seattle, WA (US)

(72) Inventors: Ramya Gopalan, Cupertino, CA (US); Shiva Kumar Sundaram, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 14/852,022

(22) Filed: Sep. 11, 2015

(65) Prior Publication Data

US 2017/0076720 A1 Mar. 16, 2017

(51) Int. Cl.
*G10L 21/00* (2013.01)
*G10L 15/22* (2006.01)
*G06F 3/16* (2006.01)
*G10L 21/0216* (2013.01)

(52) U.S. Cl.
CPC .............. *G10L 15/22* (2013.01); *G06F 3/167* (2013.01); *G10L 2015/223* (2013.01); *G10L 2021/02166* (2013.01)

(58) Field of Classification Search
None
See application file for complete search history.

(56) References Cited

U.S. PATENT DOCUMENTS 9,432,769 B1 * 8/2016 Sundaram .............. H04R 3/005
2009/0299745 A1 12/2009 Kennewick et al.
2013/0073293 A1 3/2013 Jang et al.
2013/0289996 A1 10/2013 Fry
2014/0278394 A1 * 9/2014 Bastyr ................. G10L 21/0208
704/233
2014/0278416 A1 * 9/2014 Schuster ................ G10L 17/00
704/246
2016/0155443 A1 * 6/2016 Khan .................... G06F 1/3203
704/275
2017/0076720 A1 * 3/2017 Gopalan ................ G06F 3/167

FOREIGN PATENT DOCUMENTS

DE 102014109121 1/2015
WO WO2016085776 6/2016

OTHER PUBLICATIONS

The PCT Search Report and Written Opinion dated Jan. 11, 2017 for PCT application No. PCT/US2016/050784, 19 pages.
The PCT Invitation to Pay Additional Fees dated Nov. 4, 2016 for PCT application No. PCT/US2016/050784, 7 pages.

(Continued)

*Primary Examiner* — Marcus T Riley
(74) *Attorney, Agent, or Firm* — Lee & Hayes, PLLC

(57) ABSTRACT

Architectures and techniques for selecting a voice-enabled device to handle audio input that is detected by multiple voice-enabled devices are described herein. In some instances, multiple voice-enabled devices may detect audio input from a user at substantially the same time, due to the voice-enabled devices being located within proximity to the user. The architectures and techniques may analyze a variety of audio signal metric values for the voice-enabled devices to designate a voice-enabled device to handle the audio input.

19 Claims, 5 Drawing Sheets

(56) References Cited

OTHER PUBLICATIONS

U.S. Appl. No. 14/447,498, filed Jul. 30, 2014, Amit Chhetri, Ramya Gopalan, Philip Hilmes, Shiva Sundaram, "Method and System for Beam Selection in Microphone Array Beamformers", 33 pages.
U.S. Appl. No. 14/727,504, filed Jun. 1, 2015, Ramya Gopalan, Shiva Sundaram, "Feedback Based Beamformed Signal Selection", 40 pages.

\* cited by examiner

ARBITRATION BETWEEN VOICE-ENABLED DEVICES

BACKGROUND

Users are increasingly employing voice-enabled devices to perform tasks. In many instances, a user may provide speech input while being located within proximity to multiple voice-enabled devices. The speech input may request that a task be performed. Each of the voice-enabled devices may detect the speech input and process the speech input to perform the task for the user. This may result in a same task being performed multiple times for the user. Further, in some instance, each of the voice-enabled devices may respond to inform the user that the task has been performed, request additional information, and so on. This ultimately creates an undesirable user experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates an example process to perform initial processing to select voice-enabled devices to arbitrate between.

DETAILED DESCRIPTION

Figure 1:
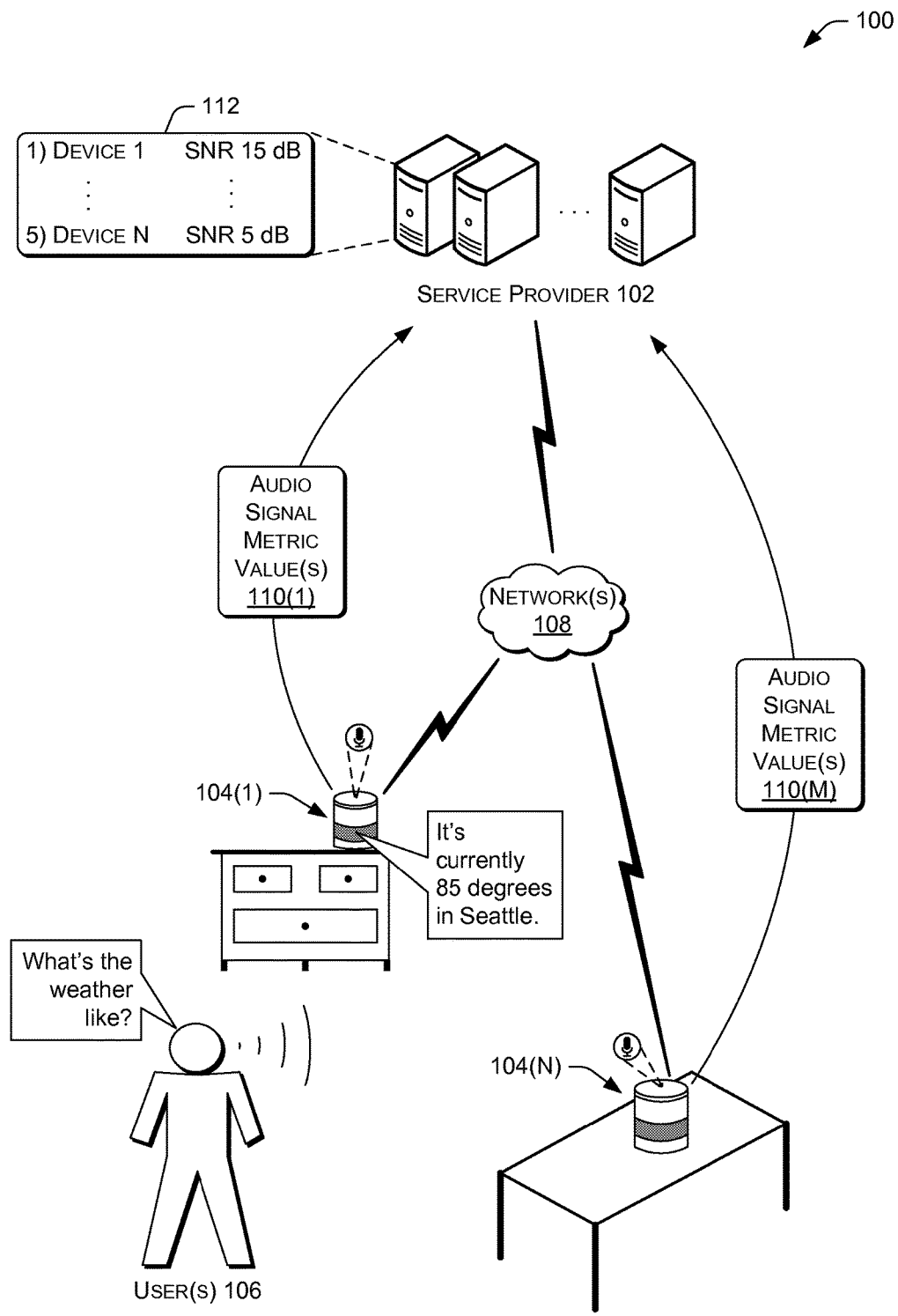
FIG. 1 illustrates an example architecture in which techniques described herein may be implemented.

This disclosure describes architectures and techniques for selecting a voice-enabled device to handle audio input that is detected by multiple voice-enabled devices. In some instances, multiple voice-enabled devices may detect audio input from a user at substantially the same time, due to the voice-enabled devices each being located within proximity to the user. The architectures and techniques may analyze a variety of audio signal metric values for the voice-enabled devices to designate a voice-enabled device to handle processing of the audio input. This may enhance the user's experience by avoiding duplicate input processing. Further, this may allow a best audio signal to be processed.

In some implementations, a service provider may identify multiple voice-enabled devices that detect audio input. The voice-enabled devices may be located within proximity to each other, and thus, detect the audio input at substantially the same time. In some instances, some or all of the voice-enabled devices include sensor arrays (e.g., microphone arrays) that provide input signals for determining a plurality of audio signals (e.g., beamformed audio signals associated with different look directions). The service provider may select one or more of the voice-enabled devices to handle the audio input based on audio signal metric values received from the voice-enabled devices. For example, each voice-enabled device may provide at least one audio signal metric value to the service provider for an audio signal that is determined at the voice-enabled device.

An audio signal metric value may indicate a characteristic of an audio signal. For example, an audio signal metric value may include a signal-to-noise ratio, a spectral centroid measure, a speech energy level, a spectral flux, a particular percentile frequency, a periodicity, a clarify, a harmonicity, and so on. An audio signal metric value may be specific to one audio signal or may be applicable to multiple audio signals. As one example, a voice-enabled device may determine multiple beamformed audio signals and select a beamformed audio signal that is associated with an audio signal metric value that has a highest value. Here, the voice-enabled device may send the audio signal metric value of the selected beamformed audio signal to the service provider to enable the service provider to select a voice-enabled device to handle processing of the audio input. As another example, a voice-enabled device may send audio signal metric values for each beamformed audio signal that is determined at the voice-enabled device. As yet a further example, a voice-enabled device may send an average audio signal metric value for beamformed audio signals that are determined at the voice-enabled device. In other examples, a voice-enabled device may send other types of audio signal metric values (e.g., weighted audio signal metric values, etc.).

In any event, the service provider may rank the voice-enabled devices based on audio signal metric values. For example, a first voice-enabled device may be ranked higher than a second voice-enabled device if a signal-to-noise ratio for an audio signal determined at the first voice-enabled device is higher (greater) than a signal-to-noise ratio for an audio signal determined at the second voice-enabled device. Based on the ranking, the service provider may select a voice-enabled device to handle processing of the audio input. For instance, the service provider may select a voice-enabled device that is associated with a highest (greatest) valued audio signal metric value. The service provider may process an audio signal from the selected voice-enabled device and ignore an audio signal from the non-selected voice-enabled device. To illustrate, if a user request for weather information is detected by multiple voice-enabled devices, and the service provider selects a particular voice-enabled device, the service provider may perform speech recognition techniques on an audio signal from the selected voice-enabled device and cause a response that includes weather information to be provided via the selected voice-enabled device. Any audio signals from the non-selected device may not be further processed.

As this discussion highlights, the architectures and techniques described herein enhance a user's experience with multiple voice-enabled devices that may surround the user. For example, by selecting a voice-enabled device to handle audio input that is detected by multiple voice-enabled devices, the architectures and techniques may avoid duplication of speech processing and/or response formation. Further, by avoiding duplication of speech processing and/or response formation, the architectures and techniques may reduce an amount of processing and/or a number of communications (e.g., reduce communications with voice-enabled devices to process input and/or provide responses). In addition, in many instances, the architectures and techniques may select a voice-enabled device that is associated with a best audio signal (e.g., best quality signal).

Although in many instances the techniques for selecting a voice-enabled device are discussed as being performed by a service provider, the techniques may additionally, or alternatively, be performed by a voice-enabled device and/or another computing device (e.g., laptop computer, smart phone, third party service, etc.).

This brief introduction is provided for the reader's convenience and is not intended to limit the scope of the claims, nor the following sections. Furthermore, the techniques described in detail below may be implemented in a number of ways and in a number of contexts. Example implementations and contexts are provided with reference to the following figures, as described below in more detail. However, the following implementations and contexts are but some of many.

Example Architecture

FIG. 1 illustrates an example architecture 100 in which techniques described herein may be implemented. The architecture 100 includes a service provider 102 configured to communicate with a plurality of voice-enabled devices 104(1)-(N) (collectively "the voice-enabled devices 104") to facilitate various processing. For example, the service provider 102 may receive audio signals from the voice-enabled devices 104 for audio input that is provided by one or more users 106 (hereinafter "the user 106"). The service provider 102 may process the audio signals to perform tasks for the user 106, formulate responses to the user 106, and so on. In some instances, the service provider 102 may select one of the voice-enabled devices 104 to handle audio input that is detected by several devices of the voice-enabled devices 104. Additionally, or alternatively, in some instances the service provider 102 may select a same or different one of the voice-enabled devices 104 to handle audio output. The service provider 102 and the voice-enabled devices 104 may communicate via one or more networks 108. The one or more networks 108 may include any one or combination of multiple different types of networks, such as cellular networks, wireless networks, Local Area Networks (LANs), Wide Area Networks (WANs), Personal Area Networks (PANs), the Internet, and so on. Although not illustrated in FIG. 1, each of the voice-enabled devices 104 may be connected to a wireless access point, such as a wireless router, cell tower, and so on. For example, each of the voice-enabled devices 104 may be wirelessly connected to a wireless router located in a residence of the user 106. Alternatively, or additionally, the voice-enabled devices 104 may be connected to each other via a wired connection.

The service provider 102 may be implemented as one or more computing devices including one or more servers, desktop computers, laptop computers, or the like. In one example, the service provider 102 is configured in a server cluster, server farm, data center, mainframe, cloud computing environment, or a combination thereof. To illustrate, the service provider 102 may include any number of devices that operate as a distributed computing resource (e.g., cloud computing, hosted computing, etc.) that provides services, such as storage, computing, networking, and so on.

The service provider 102 may perform a variety of operations to assist the voice-enabled devices 104 in interacting with the user 106. The service provider 102 may generally receive audio signals and other information from the voice-enabled devices 104, process the audio signals and/or other information (e.g., using speech recognition, Natural Language Processing (NPL), etc.), perform tasks based on the processed audio signals, formulate responses for the voice-enabled devices 104, and so on. For example, if the user 106 requests the voice-enabled device 104(N) to "play Tom Petty," the service provider 102 may process an audio signal from the voice-enabled device 104(N) and, upon understanding the user request, instruct the voice-enabled device 104(N) to play a song by Tom Petty.

In some instances, the service provider 102 may arbitrate between multiple voice-enabled devices that detect audio input from a same audio source. To do so, the service provider 102 may analyze audio signal metric values for audio signals that are determined at the voice-enabled devices. As one example, assume that the voice-enabled device 104(1) is located on a cabinet in a hallway and the voice-enabled device 104(N) is located on a table in a kitchen that is connected to the hallway. Assume also that the user 106 says "What's the weather like?" while traveling down the hallway to the kitchen and each of the voice-enabled devices 104(1) and 104(N) detects the speech input. Here, each of the voice-enabled devices 104(1) and 104(N) may initiate communication with the service provider 102 to process the speech input by sending an audio signal that is determined at the respective voice-enabled device and/or an audio signal metric value for the audio signal. Each audio signal metric value may generally indicate a characteristic of an associated audio signal. As illustrated in FIG. 1, the voice-enabled device 104(1) may send one or more audio signal metric values 110(1) to the service provider 102, while the voice-enabled device 104(N) may send one or more audio signal metric values 110(M). The service provider 102 may rank the voice-enabled devices 104(1) and 104(N) based on the audio signal metric values, as illustrated at 112 in FIG. 1. The service provider 102 may select a voice-enabled device from the ranking (e.g., a top ranked device). The service provider 102 may then process the audio signal from the selected voice-enabled device and perform a task for the user 106. In this example, the user 106 has asked for weather information and, as such, the service provider 102 provides the weather information to the voice-enabled device 104(1) to be output as a spoken audio "It's currently 85 degrees in Seattle." Meanwhile, the service provider 102 may disregard (or refrain from processing) the audio signal from the non-selected device, the voice-enabled device 104(N).

Each of the voice-enabled devices 104 may be implemented as a computing device, such as a laptop computer, a desktop computer, a server, a smart phone, an electronic reader device, a mobile handset, a personal digital assistant (PDA), a portable navigation device, a portable gaming device, a tablet computer, a watch, a portable media player, a wearable computing device (e.g., a watch, an optical head-mounted display (OHMD), etc.), a television, a computer monitor or display, a set-top box, a computer system in a vehicle, an appliance, a camera, a robot, a hologram system, a security system, a thermostat, a smoke detector, an intercom, a home media system, a lighting system, a heating, ventilation and air conditioning (HVAC) system, a home automation system, a projector, an automated teller machine (ATM), a voice command device (VCD), and so on. In some instances, the computing device may comprise a mobile device, while in other instances the computing device may be a stationary device. Although the voice-enabled devices 104 are illustrated in FIG. 1 as the same type of device, each of the voice-enabled devices 104 may be any type of device configured with any number of components.

In the example architecture 100 of FIG. 1, the device arbitration techniques are discussed as being performed by the service provider 102. However, in other instances the techniques may be performed by other devices, such as one of the voice-enabled devices 104. To illustrate, the voice-enabled device 104(1) may be designated as an arbitrator to select a particular device to handle audio input when the voice-enabled devices 104(1) and 104(N) both detect audio input from a same audio source. Here, the voice-enabled device 104(1) may communicate with the voice-enabled device 104(N) (e.g., via a wireless or wired connection) to receive audio signals and/or audio signal metric values. The voice-enabled device 104(1) may perform the arbitration techniques discussed above in reference to the service provider 102 to select one of the voice-enabled devices 104. In some instances, the voice-enabled device 104(1) may act as a relay or backhaul connection for the voice-enabled device 104(N) (e.g., communicate with the service provider 102 on behalf of the voice-enabled device 104(N)). While in other instances, the voice-enabled device 104(N) may not communicate through the voice-enabled device 104(1).

Example Service Provider

Figure 2:
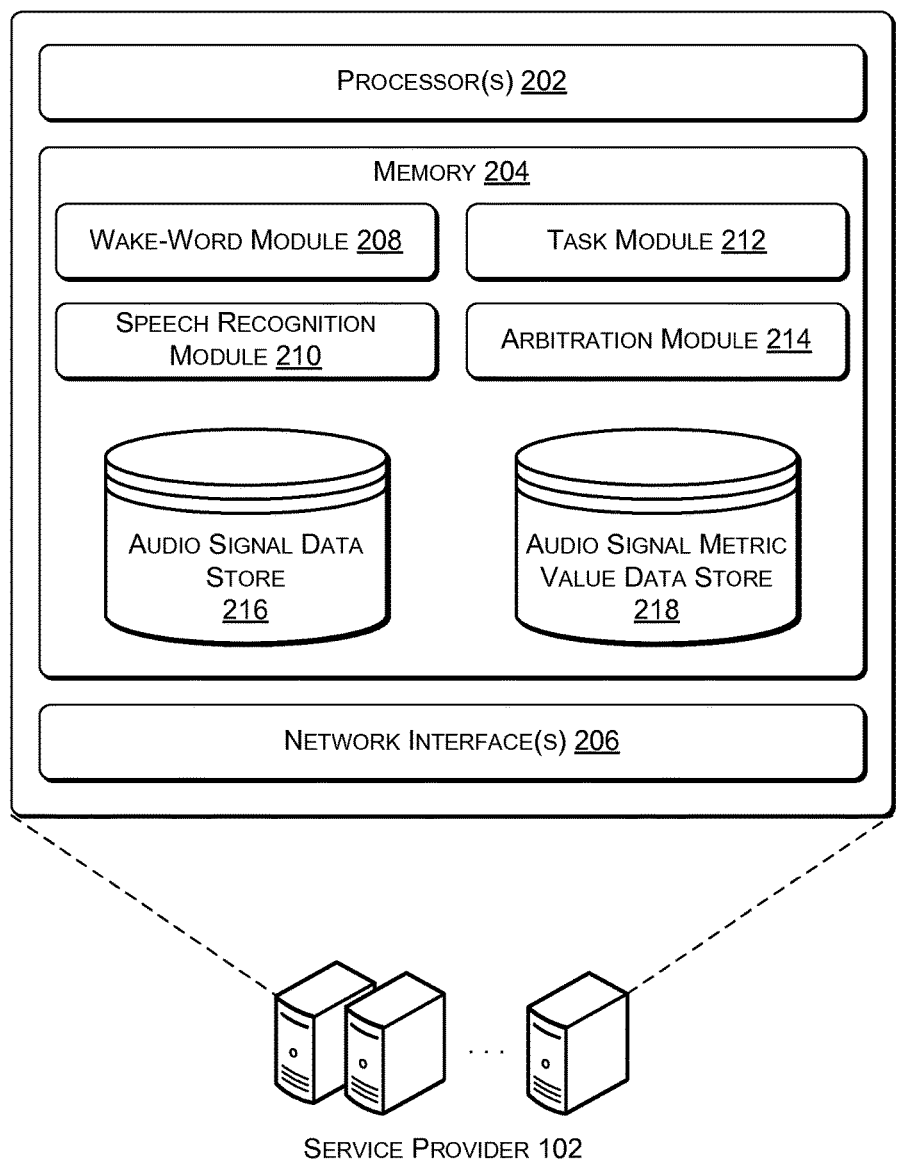
FIG. 2 illustrates example components of a service provider.

FIG. 2 illustrates example components of the service provider 102 of FIG. 1. As discussed above, the service provider 102 may be implemented as one or more computing devices. The one or more computing devices may be equipped with one or more processors 202, memory 204, and one or more network interfaces 206. The one or more processors 202 may include a central processing unit (CPU), a graphics processing unit (GPU), a microprocessor, a digital signal processor, and so on.

The memory 204 may include software and/or firmware functionality configured as one or more "modules." The term "module" is intended to represent example divisions of the software and/or firmware for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). As illustrated in FIG. 2, the memory 204 may include a wake-word module 208, a speech recognition module 210, a task module 212, and an arbitration module 214. The modules 208, 210, 212, and/or 214 may be executable by the one or more processors 202 to perform various operations.

The wake-word module 208 may be configured to detect particular words or phrases in audio signals (e.g., "wake" words or other keywords or phrases spoken to initiate interaction with a computing device). For example, the wake-word module 208 may identify potential key words in a received audio signal which will trigger (e.g., wake/activate) a system. The wake-word module 208 may receive one or more beamformed audio signals to determine whether a portion of the beamformed audio signal is likely to contain information corresponding to a word or phrase to be detected. An audio signal data store 216 may store one or more audio signals received from the voice-enabled devices 104. Once a potential wake-word is detected, the beamformed audio signal may be passed to the speech recognition module 210 to determine which words or phrases are present.

The wake-word module 208 may provide a wake-word result indicating whether a wake-word was detected. A failure to detect a wake-word may be due to, for example, an error or because no wake-word was detected. In some implementations where a wake-word is detected, the wake-word result may also include the potential wake-word. Additionally, or alternatively, the wake-word result may include a recognition confidence score indicating a confidence of recognizing a wake-word. Because recognition is a prediction, the recognition confidence score may indicate a degree of confidence in the recognition prediction. In some instances, a wake-word result may be provided (e.g., as feedback) to another component, such as another module of the service provider 102 and/or a module of one of the voice-enabled devices 104 (e.g., a beam selector module to be used during beam selection). Further, in some instances output from another module of the service provider 102 (e.g., the speech recognition module 210) and/or a module of one of the voice-enabled devices 104 may be provided to the wake-word module 208 to assist in detection of a wake-word.

In some instances, the voice-enabled devices 104 may continuously listen to speech to detect wake-words. Here, the voice-enabled devices 104 may continuously provide beamformed audio signals to the service provider 102 to identify wake-words. Upon detecting a wake-word, further processing may be performed. In other instances, the wake-word module 208 may be implemented locally on one of the voice-enabled devices 104. Here, one of the voice-enabled devices 104 may listen to speech to detect wake-words and pass processing to the service provider 102 upon detection of a wake-word (e.g., pass processing to the speech recognition module 210).

The speech recognition module 210 may perform various speech recognition techniques (sometimes referred to as Automatic Speech Recognition (ASR)) on audio signals. The speech recognition module 210 may provide a transcript or other output regarding recognition of words in an audio signal. The speech recognition module 210 may provide a result indicating whether an audio signal was accepted for speech recognition, whether a word was recognized from the audio signal, a confidence in a recognized word (e.g., a recognition confidence score indicating a confidence of recognizing a word), and so on. In one example, a recognition confidence score may indicate a level of confidence that a word is accurately detected. In some instances, the result may be provided (e.g., as feedback) to another module of the service provider 102 and/or a module of one of the voice-enabled devices 104 (e.g., a beam selector module to be used during beam selection). If a word is detected by the speech recognition module 210, a transcript (and/or an audio signal) may be passed to the task module 212.

The task module 212 may be configured to analyze information from the speech recognition module 210 (and/or other modules) to interpret input and/or perform a task. In some instances, the task module 212 employs Natural Language Processing (NLP) techniques to determine a meaning of a transcript (e.g., text). Based on the meaning, the task module 212 may identify a task to be performed and/or a response to be provided. For example, in response to a request "please place an order for more batteries" that is received at a voice-enabled device, the task module 212 may perform a task of ordering batteries through an e-commerce site and then send an instruction to the voice-enabled device to provide an indication that the batteries were ordered (e.g., audio output of "okay, I have placed an order for more batteries"). In other examples, other types of tasks may be performed, such as setting a calendar appointment, placing a telephone call, providing weather information, playing music, and so on. Further, other types of responses may be provided, such as running on a light to indicate that a task has been performed, providing a particular audible sound (e.g., beep), and so on.

The arbitration module 214 may be configured to select a voice-enabled device to handle input and/or output. As noted above, in some instances multiple voice-enabled devices may detect a same utterance from a user (or a same sound from a source), which may result in each of the voice-enabled devices attempting to handle the utterance. In such instances, the service provider 102 may arbitrate between the voice-enabled devices to select a best voice-enabled device to handle the interaction with the user. Further, this may allow a best signal to be processed (e.g., a signal that most accurately represents the utterance).

In some instances, to select a voice-enabled device, the arbitration module 214 may perform initial processing to identify voice-enabled devices that may potentially be selected (e.g., identify voice-enabled devices to arbitrate between). That is, the arbitration module 214 may determine a group of voice-enabled devices to select from. For example, if multiple voice-enabled devices are located within a home, the arbitration module 214 may perform initial processing to identify a sub-set of the multiple devices that may potentially be best for interacting with a user. The arbitration module 214 may perform the initial processing at runtime (e.g., in real-time when an arbitration process is to be performed) and/or beforehand.

In one example, the initial processing may select voice-enabled devices that are located within a predetermined distance/proximity to each other and/or an audio source. For instance, it may be determined that multiple voice-enabled devices are located within proximity to each other (e.g., in a same room, a number of feet away from each other) based on locations identified from Global Positioning System (GPS) sensors for the devices. Alternatively, or additionally, it may be determined that multiple voice-enabled devices are located within proximity to each other based on the devices being connected to a same wireless access point. Here, the wireless access point may provide coverage for a particular area, such as a room, house, etc. Further, it may be determined that multiple voice-enabled devices are located within proximity to each other based on signal strength to a wireless access point. To illustrate, if a wireless connection for a voice-enabled device to a wireless access point is above a strength threshold (e.g., indicating a relatively strong signal) and a wireless connection for another voice-enabled device to the same wireless access point is above the strength threshold, the two devices may be determined to be within proximity to each other. The predetermined distance/proximity may be set by an administrator, the service provider 102, an end-user, and so on. The predetermined distance/proximity may be set to any value, such as an average distance (determined over time) at which a user can be heard by a voice-enabled device when speaking at a particular decibel level.

In another example, the initial processing may select voice-enabled devices that determined audio signals at substantially the same time (e.g., within a window of time). To illustrate, two voice-enabled devices may be selected if the devices each generated an audio signal within a threshold amount of time of each other (e.g., within a same span of time—window of time). The selection may be based on time-stamps for the audio signals. Each time-stamp may indicate a time that the audio signal was generated. If the audio signals are generated close to each other in time, this may indicate, for example, that the devices heard the same utterance from a user. The threshold amount of time may be set by an administrator, the service provider 102, an end-user, and so on.

In yet another example, the initial processing may select voice-enabled devices that are associated with a same user account. To illustrate, multiple voice-enabled devices may be selected if they are each linked (registered) to a same user account, such as an account created to access content, an account for accessing a voice-enabled device, or any other account.

In a further example, the initial processing may select voice-enabled devices that determined audio signals that have a threshold amount of similarity to each other (e.g., indicating that the devices heard the same utterance). An amount of similarity between audio signals may be determined through, for instance, statistical analysis using techniques, such as Kullback-Leibler (KL) distance/divergence, dynamic time warping, intra/inter cluster differences based on Euclidian distance (e.g., intra/inter cluster correlation), and so on.

In another example, the initial processing may select voice-enabled devices that are associated with recognition confidence scores (for audio signals) that are each above a threshold (e.g., indicating that the devices accurately recognized a word). To illustrate, multiple voice-enabled devices may be selected if each device recognized a word in an audio signal and each device has a confidence value (indicating an accuracy of recognizing the word) that is above a threshold. A confidence value that is above the threshold may indicate that the device was relatively confident that the audio signal includes the word.

In any event, to select a voice-enabled device the arbitration module 214 may generally rank multiple voice-enabled devices that detect a same sound. The ranking may include ranking audio signals from the multiple voice-enabled devices. The ranking may be based on a variety of information. For instance, voice-enabled devices may be ranked based on audio signal metric values received from the voice-enabled devices. A voice-enabled device that ranks at the top of the list (or toward the top of the ranking) may be selected to handle audio input. An audio signal metric value may include a signal-to-noise ratio, a spectral centroid measure, a speech energy level, a spectral flux, a particular percentile frequency, a periodicity, a clarity, a harmonicity, and so on. Audio signal metric values may be stored in an audio signal metric value data store 218. Audio signal metric values are discussed in further detail below in reference to FIG. 3.

As one example of ranking voice-enabled devices, the arbitration module 214 may receive an audio signal metric value from each of the voice-enabled devices. Each audio signal metric value may represent an audio signal metric value that has a highest value from among a plurality of audio signals determined by a respective voice-enabled device. To illustrate, a first voice-enabled device may select an audio signal for processing an utterance (a best audio signal as discussed in detail below in reference to FIG. 3) and send an audio signal metric value for the audio signal to the service provider 102. Similarly, a second voice-enabled device that detects the same utterance, may select an audio signal for processing (a best audio signal) and send an audio signal metric value for the audio signal to the service provider 102. The service provider 102 may rank the two voice-enabled devices according to the respective audio signal metric values. If, for example, the first voice-enabled device is associated with a larger SNR value than the second voice-enabled device, the first voice-enabled device may be ranked higher (toward the top of the list), and may be selected over the second voice-enabled device.

As another example, the arbitration module 214 may rank voice-enabled devices based on metrics for audio signals for each respective voice-enabled device. Here, instead of each voice-enabled device providing an audio signal metric value for a selected audio signal (e.g., a best audio signal at the device), each voice-enabled device may provide an audio signal metric value for each of multiple audio signals of the voice-enabled device (e.g., some or all of the determined audio signals). As such, the ranking may include multiple entries for each of the voice-enabled devices (e.g., rank a particular device a first time for a first audio signal metric value and a second time for a second audio signal metric value).

As yet another example, the arbitration module 214 may rank each voice-enabled device based on multiple audio signal metric values (e.g., different types of audio signal metric values). To illustrate, a voice-enabled device may be ranked according to an SNR value for the voice-enabled device and a spectral centroid measure for the voice-enabled device. In some instances, different types of audio signal metric values may be weighted differently.

As a further example, the arbitration module 214 may rank voice-enabled devices based on average audio signal metric values. Here, each voice-enabled device may send an average audio signal metric value across multiple audio signals for the voice-enabled device. To illustrate, if a voice-enabled device determines three beamformed audio signals, the voice-enabled device may send an average audio signal metric value for the three beams (e.g., an average SNR). In some instances, if an average audio signal metric value is larger for a voice-enabled device than another voice-enabled device, this may indicate that the voice-enabled device is closer to an audio source than the other voice-enabled device.

In some instances, the arbitration module 214 may rank voice-enabled devices based on weighted audio signal metric values. To illustrate, a voice-enabled device may select an audio signal that is associated with a best audio signal metric value (e.g., maximum/highest audio signal metric value or, in some instances, minimum/lowest audio signal metric value) for audio signals for the voice-enabled device. The best audio signal metric value may weighted by a difference (variance) between the best audio signal metric value (e.g., maximum/highest audio signal metric value) and a worst audio signal metric value (e.g., minimum/lowest audio signal metric value) for the audio signals of the voice-enabled device. The weighted audio signal metric value may be sent to the service provider 102 to rank multiple voice-enabled devices.

Further, in some instances the arbitration module 214 may rank audio signals and/or voice-enabled devices based on historical statistics. For example, audio signal metric values of audio signals may be collected over time from a variety of voice-enabled devices. If it is determined that a particular beamformed audio signal from a voice-enabled device has historically been a best signal for that voice-enabled device or across voice-enabled devices (e.g., due to the particular signal having a highest SNR), the arbitration module 214 may apply more weighting to the particular beamformed audio signal, so that the particular beamformed audio signal would rank higher than another beamformed audio signal. As such, the arbitration module 214 may learn over time which audio signals and/or voice-enabled devices are generally best to use. To illustrate, the arbitration module 214 may learn that three particular beamformed audio signals of a voice-enabled device that is located next to a wall are generally relatively good audio signals, while three other beamformed audio signals are relatively poor signals. In another illustration, the arbitration module 214 may learn that a particular beamformed audio signal is generally a best audio signal, since a user generally speaks in a same location.

In any event, the arbitration module 214 may use a ranking to select a voice-enabled device. In some examples, a voice-enabled device that appears at a top of the ranking (or toward the top—in a particular position around the top) may be selected to handle processing. Further, in some examples where a voice-enabled device appears in a ranking multiple times (for multiple audio signal metric values), the arbitration module 214 may select a voice-enabled device that appears most in a top N number of places in the ranking. N may be an integer greater than 2. To illustrate, the arbitration module 214 may select a first voice-enabled device that occupies two of the top three positions in a ranking.

In some instances, if the arbitration module 214 is unable to identify a best voice-enabled device from a ranking, the arbitration module 214 may repeat the ranking operations for different information. For example, if two voice-enabled devices both occupy a top position in ranking that is based on SNR (or each occupy a top N number of places), the arbitration module 214 may rank the two voice-enabled devices again based on speech energy level.

While many operations are described herein as being performed by the service provider 102, any of these operations may be performed by other devices, such as any one of the voice-enabled devices 104. As such, any one of the voice-enabled devices 104 may include any of the modules 208, 210, 212, and/or 214 to perform processing locally. As an example, the arbitration module 214 may be stored in memory of one of the voice-enabled devices 104 and perform local processing at the voice-enabled device 104 to select a voice-enabled device to handle input and/or output. Additionally, or alternatively, any of the modules 208, 210, 212, and/or 214 may be implemented across various different computing devices, such as multiple service providers. Furthermore, while various operations are described as being performed by modules, any of these operations, and/or other techniques described herein, may be implemented as one or more hardware logic components, such as Field-Programmable Gate Arrays (FPGAs), Application-Specific Integrated Circuits (ASICs), System-on-a-chip systems (SOCs), Complex Programmable Logic Devices (CPLDs), etc.

Example Voice-Enabled Device

Figure 3:
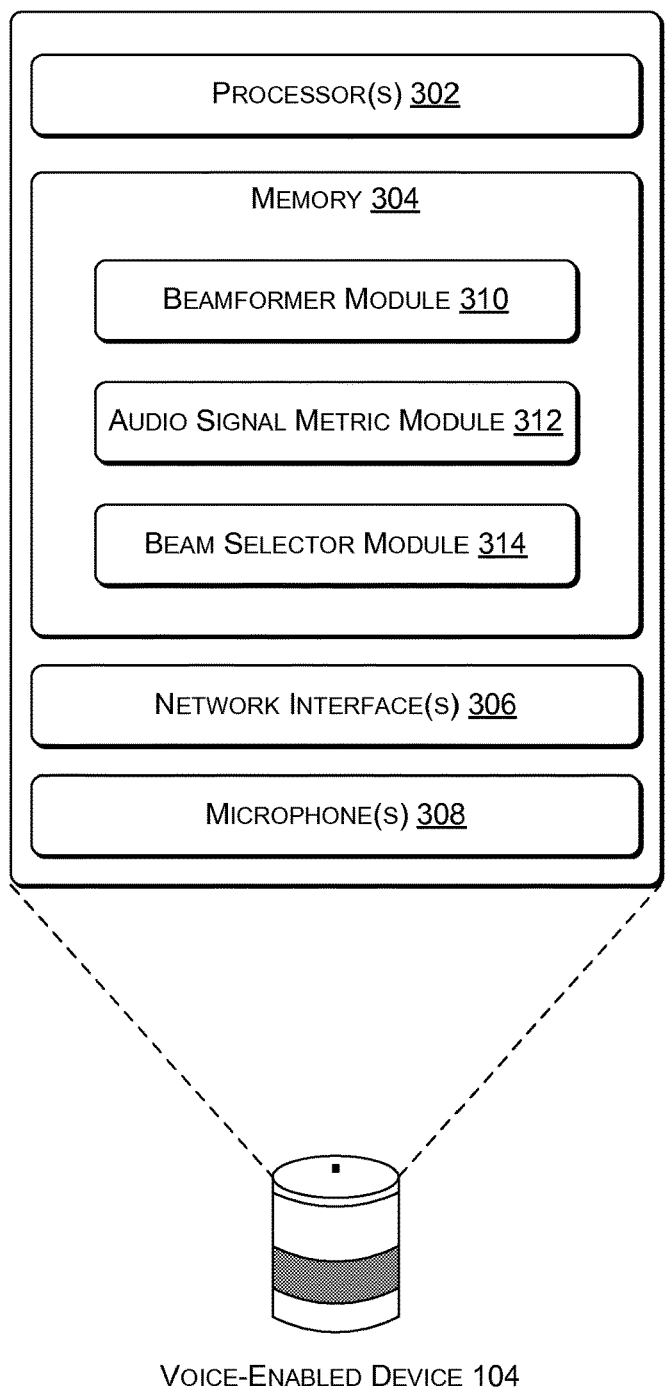
FIG. 3 illustrates example components a voice-enabled device.

FIG. 3 illustrates example components of one of the voice-enabled devices 104 of FIG. 1. The voice-enabled device 104 may include one or more processors 302, memory 304, one or more network interfaces 306, and one or more microphones 308 (hereinafter "the microphones 308"). The one or more processors 302 may include a central processing unit (CPU), a graphics processing unit (GPU), a microprocessor, a digital signal processor, and so on. Although not illustrated, the voice-enabled device 104 may also include one or more input/output devices (e.g., mouse, keyboard, etc.), one or more cameras (e.g., rear-facing, front facing, etc.), one or more displays (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more speakers, one or more lights, and so on. Any number of components of the voice-enabled device 104 may be used to receive input from a user and/or to output a response. For example, the microphones 308 may detect speech input from a user and a speaker or light may respond with an indication that a task has been performed for the speech input (e.g., audio output of "I have ordered the item for you," enabling a light, etc.). Further, the one or more network interfaces 306 may communicate over one or more networks (e.g., receive or send information to the service provider 102, such as audio signals, audio signal metric values, and so on).

The microphones 308 may include sensors (e.g., transducers) configured to receive sound. The microphones 308 may generate input signals for audio input (e.g., sound). For example, the microphones 308 may determine digital input signals for an utterance of a user. In some instances, the microphones 308 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 308 may be in a planar configuration, or positioned apart in a non-planar three-dimensional region. In some implementations, the microphones 308 may include a spatially disparate array of sensors in data communication. For example, a networked array of sensors may be included. The microphones 308 may include omni-directional microphones, directional microphones (e.g., shotgun microphones), and so on.

The memory 304 may include a beamformer module 310, an audio signal metric module 312, and a beam selector module 314. The beamformer module 310 may receive input signals from the microphones 308 and perform signal processing on the input signals to generate audio signals. For example, the beamformer module 310 can form (e.g., determine) a plurality of beamformed audio signals using the received input signals and a different set of filters for each of the plurality of beamformed audio signals. The beamformer module 310 can determine each of the plurality of beamformed audio signals to have a look direction (sometimes referred to as a direction) for which a waveform detected by a sensor array (e.g., microphones 308) from a direction other than the look direction is suppressed relative to a waveform detected by the sensor array from the look direction. The look direction of each of the plurality of beamformed signals may be equally spaced apart from each other. As such, each beamformed audio signal may correspond to a different look direction.

In some instances, the beamforming techniques may be employed by using an adaptive or variable beamformer that implements adaptive or variable beamforming techniques. Further, in some instances multiple beamformer modules (e.g., multiple fixed beamformer modules) are provided. Each beamformer module utilizes a set of filter weights and/or delays to determine a beamformed audio signal corresponding to a particular look direction. For example, six fixed beamformer modules may be provided to determine the six beamformed audio signals, each beamformed audio signal corresponding to a different look direction. Whether fixed or adaptive beamformers are used, the resulting plurality of beamformed audio signals may be represented in an array of numbers in the form y(n)(k):

{y(1)(k), y(2)(k), . . . , y(N)(k)},

Here, "k" is a time index and "n" is an audio stream index (or look direction index) corresponding to the nth beamformed audio signal (and nth look direction).

In one implementation, the beamformer module 310 is implemented as a delay-and-sum type of beamformer adapted to use delays between each array sensor to compensate for differences in the propagation delay of a source signal direction across the sensor array. By adjusting the beamformer's weights and delays, source signals that originate from a desired direction (or location) (e.g., from the direction of a person that is speaking, such as a person providing instructions and/or input to a speech recognition system) are summed in phase, while other signals (e.g., noise, non-speech, etc.) undergo destructive interference. By adjusting or selecting the weights and/or delays of a delay-and-sum beamformer, the shape of its beamformed audio signal output can be controlled. Other types of beam former modules may be utilized, as well.

Example beamforming techniques are discussed in U.S. patent application Ser. No. 14/447,498, entitled "Method and System for Beam Selection in Microphone Array Beamformers," filed Jul. 30, 2014, and U.S. patent application Ser. No. 14/727,504, entitled "Feedback Based Beamformed Signal Selection," filed Jun. 1, 2015, the entire contents of both of which are incorporated herein by reference.

The audio signal metric module 312 may determine an audio signal metric value for each of a plurality of audio signals (e.g., beamformed audio signals) provided by the beamformer module 310. In some embodiments, each audio signal metric value is determined based on the samples of one of a plurality of frames of a beamformed audio signal. For example, a signal-to-noise ratio may be determined for a plurality of frames for each of the plurality of beamformed audio signals. The audio signal metric values f may be determined for each of the plurality of beamformed audio signals for each frame, resulting in an array of numbers in the form f(n)(k):

{f(1)(k), f(2)(k), . . . , f(N)(k)}

Here, "k" is the time index and "n" is the audio stream index (or look direction index) corresponding to the nth beamformed audio signal.

An audio signal metric value may include a signal-to-noise ratio (SNR), a spectral centroid measure (e.g., a peak spectral centriod measure), a speech energy level (e.g., a 4 Hz modulation energy), a spectral flux, a particular percentile frequency (e.g., a $90^{th}$ percentile frequency), a periodicity, a clarity, a harmonicity, and so on. A spectral centroid measure generally provides a measure for a centroid mass of a spectrum. A spectral flux generally provides a measure for a rate of spectral change. A particular percentile frequency generally provides a measure based on a minimum frequency bin that covers at least a particular percentage (e.g., 90%) of the total power. A periodicity generally provides a measure that may be used for pitch detection in noisy environments. Clarity generally provides a measure that has a high value for voiced segments and a low value for background noise. Harmonicity is another measure that generally provides a high value for voiced segments and a low value for background noise. A speech energy level (e.g., 4 Hz modulation energy) generally provides a measure that has a high value for speech due to a speaking rate. In other embodiments, any another audio signal metric value may be determined that is some function of raw beamformed signal data over a brief time window (e.g., typically not more than one frame). In some instances, an audio signal metric value may be determined based on samples of a plurality of frames of a beamformed audio signal. Further, in some instances an audio signal metric value may be referred to as a signal feature.

In some implementations, an audio signal metric value may be defined according to the following table:

| Feature Name | Formula | Description |
| --- | --- | --- |
| Spectral Centroid | $$\sum_{k=0}^{k=nBins-1} \frac{k \cdot |X_t^k|}{\sum_{j=0}^{j=nbins-1} |X_t^j|}$$ X is the FFT magnitude spectrum of spectrum of the 't'th frame. | Weighted average of the frequency spectrum. The weights are the power in the 'kth' frequency bin. This feature indicates if an acoustic source has energies predominantly in the high frequency. |
| Spectral Flux | $$\sum_{k=0}^{k=nBins-1} \||X_t^k| - |X_{t-1}^k|\|_1$$ | Rate of change in spectral energies per unit time (frame). Indicates if the audio contains transients and changes rapidly. |
| 90$^{th}$ Percentile Frequency | $$\left. \frac{\sum_{n=0}^{N} |X_t^n|^2}{\sum_{k=0}^{k=nBins-1} |X_t^k|^2} \right|_N \geq 0.9$$ | Frequency at which the cumulative energy of the frame contains more P percent of the total energy. Similar to the centroid, this feature characterizes the frequency distribution of the acoustic signal. |
| Periodicity | $$\operatorname*{argmax}_{125\ Hz \leq \omega \leq 500.0\ Hz} [P(t, \omega)] \quad P(t,\omega)=\sum_{l=1}^{R} \log|X(t,l\omega)|$$ | A measure correlated with the fundamental frequency of the acoustic signal in noisy conditions. Calculated over 'R' frames. |
| Clarity | $$\left. \frac{D(t, k_{min})}{D(t, k_{max})} \right|_{k_{max}} = \operatorname*{argmax}_{2 \leq k \leq 8\ ms} D(t, k)$$ $D(t, k_{min})$, $D(t, k_{max})$ are min and max deviation from the zero-lag autocorrelation function | A measure that characterizes the tonal content of an audio signal. This ratio is high for harmonic signals (e.g., voiced speech), but low for noisy signals. |
| Harmonicity | $$h(t) = \left. \frac{r_{xx}(t, k_{max})}{r_{xx}(t, 0) - r_{xx}(t, k_{max})} \right|_{k_{max} = \operatorname*{argmax}_{2\ ms < k < 8\ ms} r_{xx}(t,k)}$$ | Similar to clarity; high value for voiced segments and low for background noise. |

40

In some instances, the audio signal metric module 312 may determine an audio signal metric value with respect to a particular beamformed audio signal. As one example, an SNR value may be determined for a beamformed audio signal that is associated with a particular look direction. In other instances, an audio signal metric value may be determined for multiple beamformed audio signals. As one example, an average audio signal metric value may be determined for a plurality of beamformed audio signals that are determined for a voice-enabled device, such as an average SNR value across any number of beamformed audio signals for the voice-enabled device.

Further, in some instances the audio signal metric module 312 may weight an audio signal metric value. As one example, an audio signal metric value may be multiplied by a difference between an audio signal metric value (of a same type) with a largest value and an audio signal metric value (of a same type) with a smallest value from among beamformed audio signals for a voice-enabled device. To illustrate, an SNR value may be weighted by a difference between the largest SNR value and a smallest SNR value from among beamformed audio signals for a voice-enabled device. The difference (or variance) between the maximum audio signal metric value and the minimum audio signal metric value may be a measure of directivity of a beamformer (e.g., how sensitive the beamformer is to direction). For example, a relatively large difference may indicate that the beamformer is highly directional (e.g., able to detect direction of audio sources relatively well and a more desirable beamformer), while a relatively small difference may indicate that the beamformer is not very directional (e.g., unable to detect direction of an audio source very well and a less desirable beamformer). In some instances, the directivity of a beamformer may be affected by an environmental condition (e.g., positioned next to a wall, interfering object, etc.), while in other instances the directivity may be a characteristic of hardware and/or software of the beamformer and/or associated voice-enabled device. If, for example, a voice-enabled device is positioned next to a wall, there may be a relatively small variance between audio signal metric values of beamformed audio signals since audio input may reflect off the wall before being detected at the voice-enabled device.

Additionally, or alternatively, the audio signal metric module 312 may determine, for each of multiple audio signal metric values, a time-smoothed audio signal metric value (also referred to as a "smoothed audio signal metric value" or a "smoothed feature") based on a time-smoothed function of the multiple audio signal metric values f over a plurality of frames. In some embodiments, the smoothed audio signal metric value S is determined based on audio signal metric values over a plurality of frames. For example, the smoothed audio signal metric value S may be based on as few as three frames of signal feature data to as many as a thousand frames or more of signal feature data. The smoothed audio signal metric value S may be determined for each of the plurality of beamformed audio signals, resulting in an array of numbers in the form S(n)(k):

{S(1)(k), S(2)(k), . . . , S(N)(k)}

In general, audio signal metric values are statistics. An audio signal metric value may summarize the variation of certain signal features that are extracted from beamformed signals. An example of an audio signal metric value can be the peak of the audio signal metric value that denotes a maximum value of the signal over a duration. Such audio signal metric value may be smoothed (e.g., averaged, moving averaged, or weighted averaged) over time to reduce any short-duration noisiness in the audio signal metric value.

In some embodiments, a time-smoothing technique for determining a smoothed audio signal metric value S can be obtained based on the following relationship:

$$S(k)=\text{alpha}*S(k-1)+(1-\text{alpha})*f(k)$$

In this example, alpha is a smoothing factor or time constant. According to the above, determining the smoothed audio signal metric value S at a current frame (e.g., S(k)) comprises: determining a first product by multiplying the smoothed audio signal metric value S corresponding to a previous frame (e.g., S(k−1)) by a first time constant (e.g., alpha); determining a second product by multiplying the audio signal metric value at the current frame (e.g., f(k)) by a second time constant (e.g., (1−alpha)), wherein the first time constant and second time constant sum to 1; and adding the first product (e.g., alpha * S(k−1)) to the second product (e.g., (1−alpha)*f(k)).

In some embodiments, the smoothing technique may be applied differently depending on the audio signal metric value. For example, another time-smoothing technique for determining a smoothed audio signal metric value S can be obtained based on the following process:

If (f(k)>S(k)):

$$S(k)=\text{alpha\_attack}*S(k-1)+(1-\text{alpha\_attack})*f(k)$$

Else:

$$S(k)=\text{alpha\_release}*S(k-1)+(1-\text{alpha\_release})*f(k)$$

In this example, alpha_attack is an attack time constant and alpha_release is a release time constant. In general, the attack time constant is faster than the release time constant. Providing the attack time constant to be faster than the release time constant allows the smoothed audio signal metric value S(k) to quickly track relatively-high peak values of the signal feature (e.g., when f(k)>S(k)) while being relatively slow to track relatively-low peak values of the audio signal metric value (e.g., when f(k)<S(k)). In other embodiments, a similar technique could be used to track a minimum of a speech signal. In general, attack is faster when the audio signal metric value f(k) is given a higher weight and the smoothed audio signal metric value of the previous frame is given less weight. Therefore, a smaller alpha provides a faster attack.

The beam selector module 314 may receive audio signals (e.g., beamformed audio signals) and/or audio signal metric values and select an audio signal for further processing. The beam selector module 314 may generally select an audio signal that provides the audio that is closest to the source of the captured audio input (e.g., utterance of a user). The beam selector module 314 may be configured to select one of an audio signal using a variety of information. For example, the beam selector module 314 may select a beamformed audio signal that is associated with a maximum audio signal metric value from among multiple beamformed audio signals for the voice-enabled device 104. To illustrate, the beam selector module 312 may rank multiple beamformed audio signals based on their corresponding audio signal metric values. The beam selector 314 may then select a beamformed audio signal that is associated with, for example, a largest SNR value from among the multiple beamformed audio signals. The selected beamformed audio signal may be used for processing audio input (e.g., speech recognition, etc.). As one example, the selected beamformed audio signal (and/or an associated audio signal metric value) may be sent to the service provider 102 for processing. In some instances, the beam selector module 314 uses smoothed audio signal metric values for the selection.

In some embodiments, the beam selector module 314 may select a beamformed audio signal having a greatest smoothed audio signal if it is also determined that the beamformed audio signal includes voice (or speech). Voice and/or speech detection may be detected in a variety of ways, including using a voice activity detector. As one example, the beam selector module 314 can first determine whether candidate beamformed audio signals include voice and/or speech and then select a beamformed audio signal from the candidate beamformed audio signals that do include voice and/or speech. As another example, the beam selector module 314 can first determine smoothed audio signal metric values of candidate beamformed audio signals. The beam selector module 314 can then determine whether a beamformed audio signal having a smoothed audio signal metric value with the greatest value includes voice and/or speech. If it does, the beamformed audio signal having the smoothed audio signal metric value with the greatest value can be selected for further processing. If it does not, the beam selector module 314 can determine whether the beamformed signal having the next-highest smoothed audio signal metric value includes voice and/or speech. If it does, that beamformed audio signal can be selected for further processing. If not, the beam selector module 314 can continue to evaluate beamformed signals in decreasing order of smoothed audio signal metric values until a beamformed audio signal that includes voice and/or speech is determined. Such beamformed audio signal may be selected for further processing.

In some instances, to facilitate a more robust beam selection, the beam selector module 314 may select a beamformed audio signal based on feedback from one or more speech processing elements, such as a speech recognition module, wake-word module, etc. The feedback may include information indicating whether an audio signal was accepted for speech recognition, whether words were recognized from the audio signal, confidence in recognized words (e.g., how likely a word recognized by a speech recognition module is accurate), whether a task and/or response was initiated for the audio signal (e.g., played a song, added a calendar event, etc.), whether a wake-word was detected in the audio signal, confidence of recognizing a wake-word, and so on. The beam selector module 312 may utilize the feedback to rank and/or select a beamformed audio signal. For example, a beamformed audio signal which has detected a wake-word may be ranked below a beamformed audio signal which has both detected and identified a wake-word. Similarly, a beamformed audio signal which provided data resulting in a high confidence recognition detection via a speech recognition module may be ranked higher than a beamformed audio signal which provided data resulting in a lower confidence recognition.

While many operations are described herein as being performed by the voice-enabled device 104, any of these operations may be performed by other devices, such as any the service provider 102. As such, the service provider 102 may include any of the modules 310, 312, and/or 314. For example, the service provider 102 may receive beamformed audio signals from the voice-enabled device 104 and determine an audio signal metric value for each beamformed audio signal. Furthermore, while various operations are described as being performed by modules, any of these operations, and/or other techniques described herein, may be implemented as one or more hardware logic components, such as Field-Programmable Gate Arrays (FPGAs), Application-Specific Integrated Circuits (ASICs), System-on-a-chip systems (SOCs), Complex Programmable Logic Devices (CPLDs), etc.

The memory 204 and/or 304 (as well as all other memory described herein) may include one or a combination of computer-readable media (e.g., storage media). Computer-readable media includes volatile and non-volatile, removable and non-removable media implemented in any method or technology for storage of information, such as computer readable instructions, data structures, program modules, or other data. Computer-readable media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory communication media, such as modulated data signals and carrier waves without a non-transitory medium. As such, computer-readable media comprises non-transitory computer-readable media.

Example Processes

Figure 4:
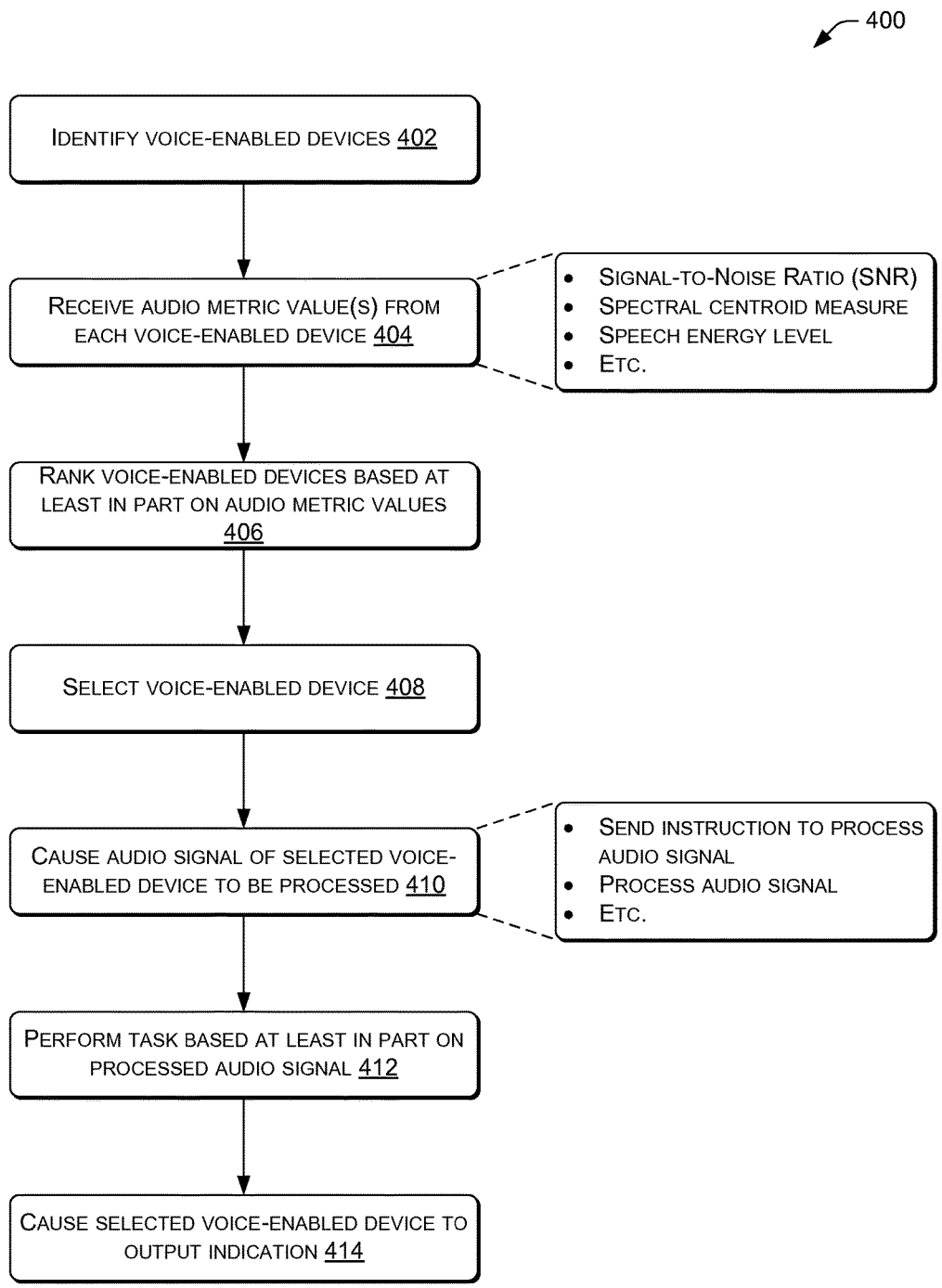
FIG. 4 illustrates an example process to arbitrate between multiple voice-enabled devices.
Figure 5:
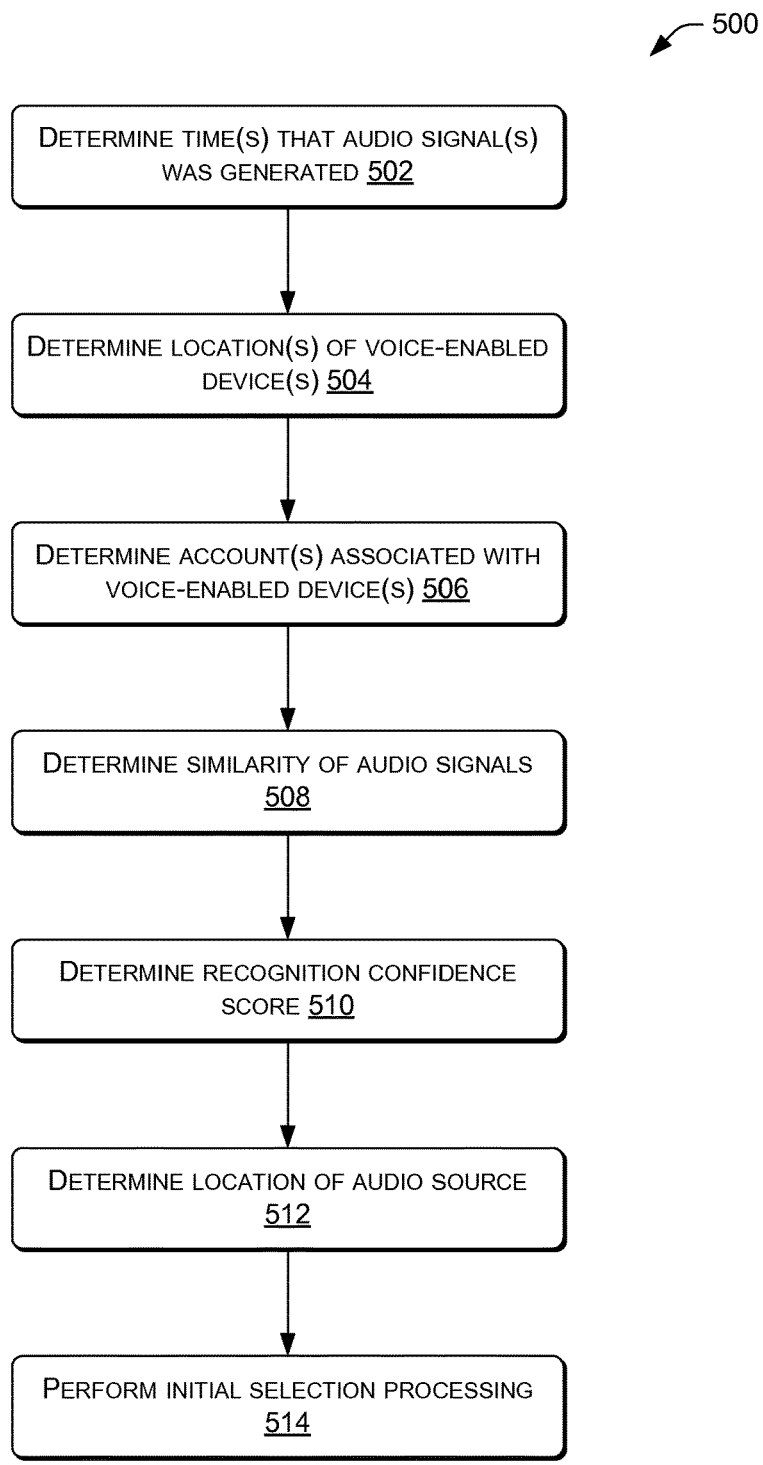

FIGS. 4 and 5 illustrate example processes 400 and 500 for employing the techniques described herein. For ease of illustration the processes 400 and 500 are described as being performed in the architecture 100 of FIG. 1. For example, one or more of the individual operations of the processes 400 and 500 may be performed by the service provider 102 and/or any of the voice-enabled devices 104. However, the processes 400 and 500 may be performed in other architectures. Moreover, the architecture 100 may be used to perform other processes.

The processes 400 and 500 are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, configure the one or more processors to cause a computing device to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of operations may be omitted.

FIG. 4 illustrates the example process 400 to arbitrate between multiple voice-enabled devices.

At 402, multiple voice-enabled devices may be identified. This may include identifying (or determining) a first voice-enabled device and a second voice-enabled device that received audio input at substantially a same time (within a threshold amount of time of each other) from a single utterance.

At 404, one or more audio signal metric values may be received from each voice-enabled device. An audio signal metric value may be for a beamformed audio signal associated with audio input that is received at a voice-enabled device. An audio signal metric value may include a signal-to-noise ratio, a spectral centroid measure, a speech energy level (e.g., a 4 Hz modulation energy), a spectral flux, a particular percentile frequency (e.g., $90^{th}$ percentile frequency), a periodicity, a clarity, a harmonicity, and so on. In one example, the operation 404 may include receiving an audio signal metric value that has a best value from among a plurality of audio signal metric values, where each of the plurality of audio signal metric values is associated with a different beamformed audio signal determined by a voice-enabled device. The audio signal metric value with the best value may be the audio signal with the highest (greatest) value. Alternatively, the audio signal metric value with the best value may be the audio signal with the lowest (smallest) value. In another example, the operation 404 may include receiving an average audio signal metric value from among a plurality of audio signal metric values for a voice-enabled device. In yet another example, the operation 404 may include receiving a plurality of audio signal metric values for a voice-enabled device. In some instances, an audio signal metric value may be weighted, such as by a difference between an audio signal metric value with a best value (highest value or, in some instances, lowest value) and an audio signal metric value with a worst value (lowest value or, in some instances, highest value) from among a plurality of audio signal metric values for a voice-enabled device.

At 406, multiple voice-enabled devices may be ranked. The operation 406 may be based on audio signal metric values for individual ones of the multiple voice-enabled devices. In some instances, a voice-enabled device may be ranked multiple times for different audio signal metric values, different techniques of ranking, and so on.

At 408, a voice-enabled device may be selected to serve as a selected voice-enabled device. As one example, the operation 408 may select a voice-enabled device that appears at the top of a ranking. As another example, the operation 408 may select a voice-enabled device that appears most in a top N number of places in the ranking, where N is an integer greater than 2.

At 410, an audio signal of a selected voice-enabled device may be caused to be processed. In some instances, the operation 410 includes sending an instruction to a service provider to process an audio signal of the selected voice-enabled device (e.g., in a case where a voice-enabled device performs the arbitration process). In other instances, the operation 410 includes processing an audio signal of the selected voice-enabled device (e.g., in a case where a service provider performs the arbitration process).

At 412, a task may be performed based at least in part on the processed audio signal. For example, the task may include performing a function that is being requested by a user.

At 414, a selected voice-enabled device may be caused to output an indication regarding a task. In some instances, the operation 414 includes sending an instruction to the selected voice-enabled device. The instruction may request that the selected voice-enabled device output an indication that the task has been completed. In other instances, the operation 414 includes outputting an indication (e.g., providing speech output, displaying a response, enabling a light, etc.).

FIG. 5 illustrates the example process 500 to perform initial processing to select voice-enabled devices to arbitrate between. In some instances, the process 500 may be performed before the process 400 of FIG. 4. In other instances, the process 500 may be performed at other times.

At 502, a time at which an audio signal associated with a voice-enabled device was generated may be determined The operation 502 may be repeated for each of multiple voice-enabled devices.

At 504, a location of a voice-enabled device may be determined. The operation 504 may be repeated for each of multiple voice-enabled devices.

At 506, an account associated with a voice-enabled device may be determined. For example, the operation 506 may identify a user account to which the voice-enabled device is registered. The operation 506 may be repeated for each of multiple voice-enabled devices.

At 508, a similarity between an audio signal associated with a first voice-enabled device and an audio signal associated with a second voice-enabled device may be determined.

At 510, a recognition confidence score for an audio signal associated with a voice-enabled device may be determined. The recognition confidence score may indicate a level of confidence regarding recognition of a word for the audio signal. The operation 510 may be repeated for each of multiple voice-enabled devices.

At 512, a location of an audio source may be determined. For example, a source localization algorithm may be used to determine where a user is located (e.g., relative to a voice-enabled device). A source localization algorithm may include Steered Response Power with Phase Transform (SRP PHAT), Generalized Crossed Correlation with Phase Transform (GCC PHAT), Minimum Variance Distortionless Response with Phase Transform (MVDR PHAT), and so on.

At 514, initial processing may be performed. The initial processing may select voice-enabled devices to arbitrate between. The initial processing may be based on one or more determinations of the operations 502-512. For example, multiple voice-enabled devices may be selected if associated audio signals are generated at the same time or within a threshold amount of time of each other (e.g., within a second, fraction of a second, etc. of each other), the devices are located within proximity to each other, the devices are associated with the same account, audio signals from the devices have a threshold amount of similarity, recognition confidence scores for audio signals from the devices are each above a threshold, the devices are located within a predetermined proximity to an audio source (e.g., user), and so on.

Although the operations 502-512 are discussed in the context of performing initial selection processing, in some instances the operations 502-512 may be performed in other contexts. For example, one or more of the determinations of the operations 502-512 may be used to assist in selecting a voice-enabled device at the operation 408 of the process 400.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:
one or more processors; and
memory communicatively coupled to the one or more processors and storing executable instructions that, when executed by the one or more processors, cause the one or more processors to perform operations comprising:
identifying a first audio signal metric value associated with a first audio signal, the first audio signal being associated with a first voice-enabled device;
identifying a second audio signal metric value associated with a second audio signal, the second audio signal being associated with a second voice-enabled device;
based at least in part on the first audio signal metric value and the second audio signal metric value, selecting the first voice-enabled device;
processing the first audio signal; and
sending an instruction to the first voice-enabled device, the instruction requesting that the first voice-enabled device output data regarding the processing.

2. The system of claim 1, wherein the operations further comprise
determining that the first audio signal and the second audio signal were generated within a threshold amount of time of each other.

3. The system of claim 1, wherein the operations further comprise:
determining that the first voice-enabled device and the second voice-enabled device are located within a predetermined distance of each other.

4. The system of claim 1, wherein the operations further comprise:
determining that the first voice-enabled device and the second voice-enabled device are associated with a same account.

5. The system of claim 1, wherein the operations further comprise:
determining that the first audio signal and the second audio signal have a threshold amount of similarity to each other.

6. The system of claim 1, wherein the operations further comprise:
determining that a first recognition confidence score for the first audio signal and a second recognition confidence score for the second audio signal are each above a threshold, the first recognition confidence score indicating a level of confidence that a word is accurately detected in the first audio signal, the second recognition confidence score indicating a level of confidence that the word or a different word is accurately detected in the second audio signal.

7. The system of claim 1, wherein the first audio signal metric value includes one of: a signal-to-noise ratio, a spectral centroid measure, a speech energy level, a spectral flux, a particular percentile frequency, a periodicity, a clarity, or a harmonicity.

8. The system of claim 1, wherein the first audio signal metric value is the highest from among a plurality of audio signal metric values, each of the plurality of audio signal metric values being associated with an audio signal that is determined at the first voice-enabled device.

9. The system of claim 1, wherein the first audio signal metric value comprises an average audio signal metric value for a plurality of audio signal metric values, each of the plurality of audio signal metric values being associated with an audio signal that is determined at the first voice-enabled device.

10. The system of claim 1, wherein the first audio signal metric value is weighted by a difference between an audio signal metric value with a highest value and an audio signal metric value with a lowest value from among a plurality of audio signal metric values, each of the plurality of audio signal metric values being associated with the first audio signal or a different audio signal that is determined at the first voice-enabled device.

11. A method comprising:
receiving, by a computing device and from a first voice-enabled device, a first audio signal metric value indicating a signal-to-noise ratio associated with a first audio signal;
receiving, by the computing device and from a second voice-enabled device, a second audio signal metric value indicating a signal-to-noise ratio associated with a second audio signal;
determining, by the computing device, that the first audio signal and the second audio signal were generated within a threshold amount of time of each other;
determining, by the computing device, that the signal-to-noise ratio associated with the first audio signal is greater than the signal-to-noise ratio associated with the second audio signal;
processing, by the computing device, the first audio signal using one or more speech recognition techniques; and
sending, by the computing device, an instruction to the first voice-enabled device, the instruction requesting that the first voice-enabled device output data regarding the processing.

12. The method of claim 11, wherein the signal-to-noise ratio of the first audio signal metric value is a greatest signal-to-noise ratio for a plurality of different audio signals, the plurality of different audio signals including the first audio signal, each of the plurality of different audio signals having been determined at the first voice-enabled device.

13. The method of claim 11, wherein the signal-to-noise ratio of the first audio signal metric value is an average signal-to-noise ratio for a plurality of different audio signals, the plurality of different audio signals including the first audio signal, each of the plurality of audio signals having been determined at the first voice-enabled device.

14. The method of claim 11, wherein the signal-to-noise ratio of the first audio signal metric value is weighted by a difference between a signal-to-noise ratio with a highest value and a signal-to-noise ratio with a lowest value for a plurality of different audio signals, the plurality of different audio signals including the first audio signal, each of the plurality of different audio signals having been determined at the first voice-enabled device.

15. A system comprising:
one or more processors; and
memory communicatively coupled to the one or more processors and storing executable instructions that, when executed by the one or more processors, cause the one or more processors to perform operations comprising:
determining a first audio signal metric value for a first audio signal of a first voice-enabled device and a second audio signal metric value for a second audio signal of a second voice-enabled device;
based at least in part on the first audio signal metric value and the second audio signal metric value, selecting the first voice-enabled device;
causing the first audio signal to be processed; and
causing the first voice-enabled device to output data regarding the processing.

16. The system of claim 15, wherein the system comprises the first voice-enabled device, the first voice-enabled device further comprising:
a microphone array including a plurality of microphones, each of the plurality of microphones being configured to determine an input signal;
wherein the operations further comprise:
determining a plurality of beamformed audio signals based at least in part on the input signals from the plurality of microphones, each of the plurality of beamformed audio signals being determined for a direction relative to the first voice-enabled device, the plurality of beamformed audio signals including the first audio signal; and
determining the first audio signal metric value.

17. The system of claim 16, wherein the operations further comprise selecting the first audio signal, from among the plurality of beamformed audio signals, based at least in part on the first audio signal metric value.

18. The system of claim 15, wherein the operations further comprise:
identifying a third audio signal metric value for the first audio signal;
wherein the selecting the first voice-enabled device is further based at least in part on the third audio signal metric value.

19. The system of claim 15, wherein the operations further comprise:
determining a difference between a beamformed audio signal metric value with a highest value and a beamformed audio signal metric value with a lowest value from among a plurality of audio signal metric values, each of the plurality of audio signal metric values being associated with an audio signal that is determined by the first voice-enabled device; and
based at least in part on the difference, weighting the first audio signal metric value to generate a weighted first audio signal metric value;
wherein the selecting the first voice-enabled device is based at least in part on the weighted first audio signal metric value.

* * * * *